F. B. CONVERSE.
TYPOGRAPHICAL MACHINE.
APPLICATION FILED JAN. 21, 1914.
1,129,851.
Patented Mar. 2, 1915.
13 SHEETS—SHEET 7.
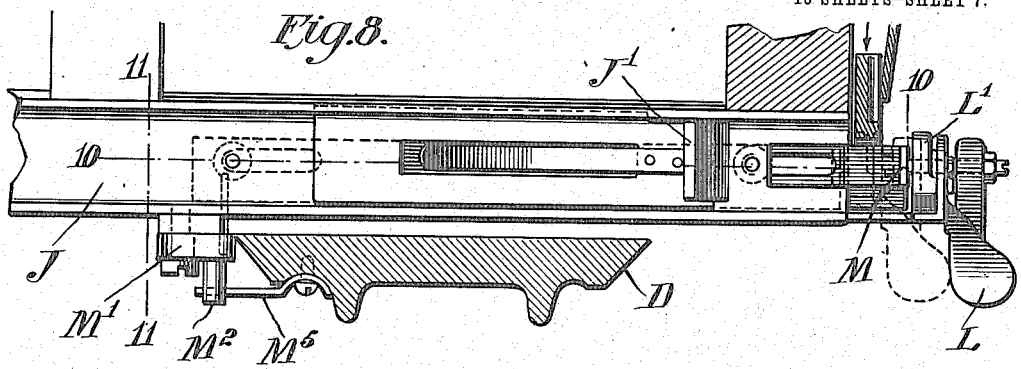
Fig. 8.
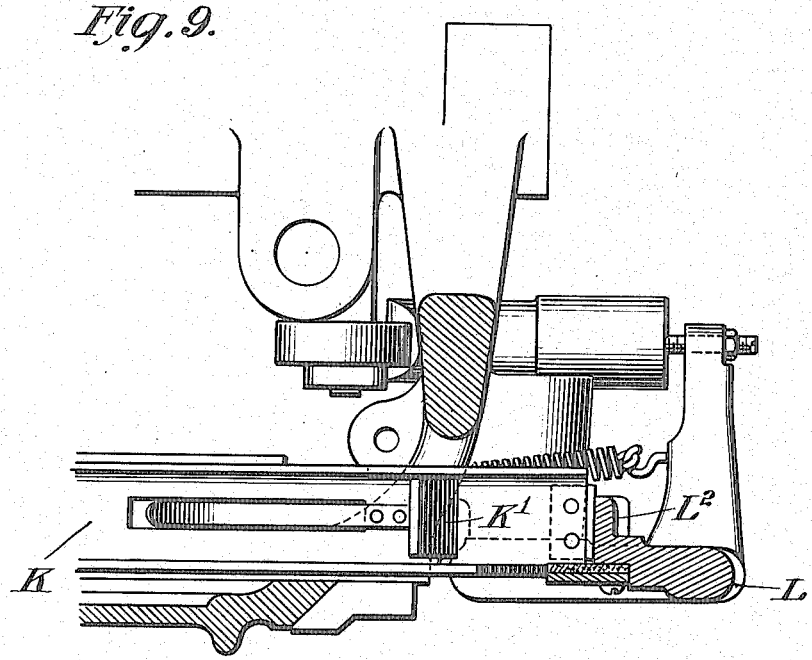
Fig. 9.
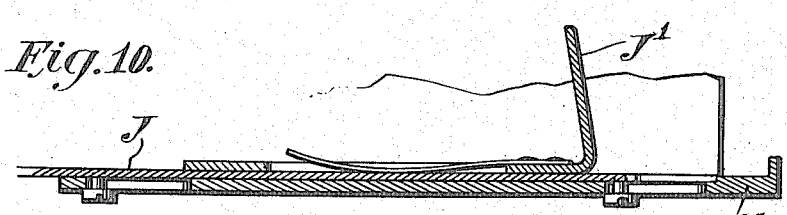
Fig. 10.
Fig. 11.
WITNESSES:
Geo. P. Kingsbury
L. E. Morrison
INVENTOR
Francis B. Converse
BY
Rogers, Kennedy & Campbell
His ATTORNEYS.

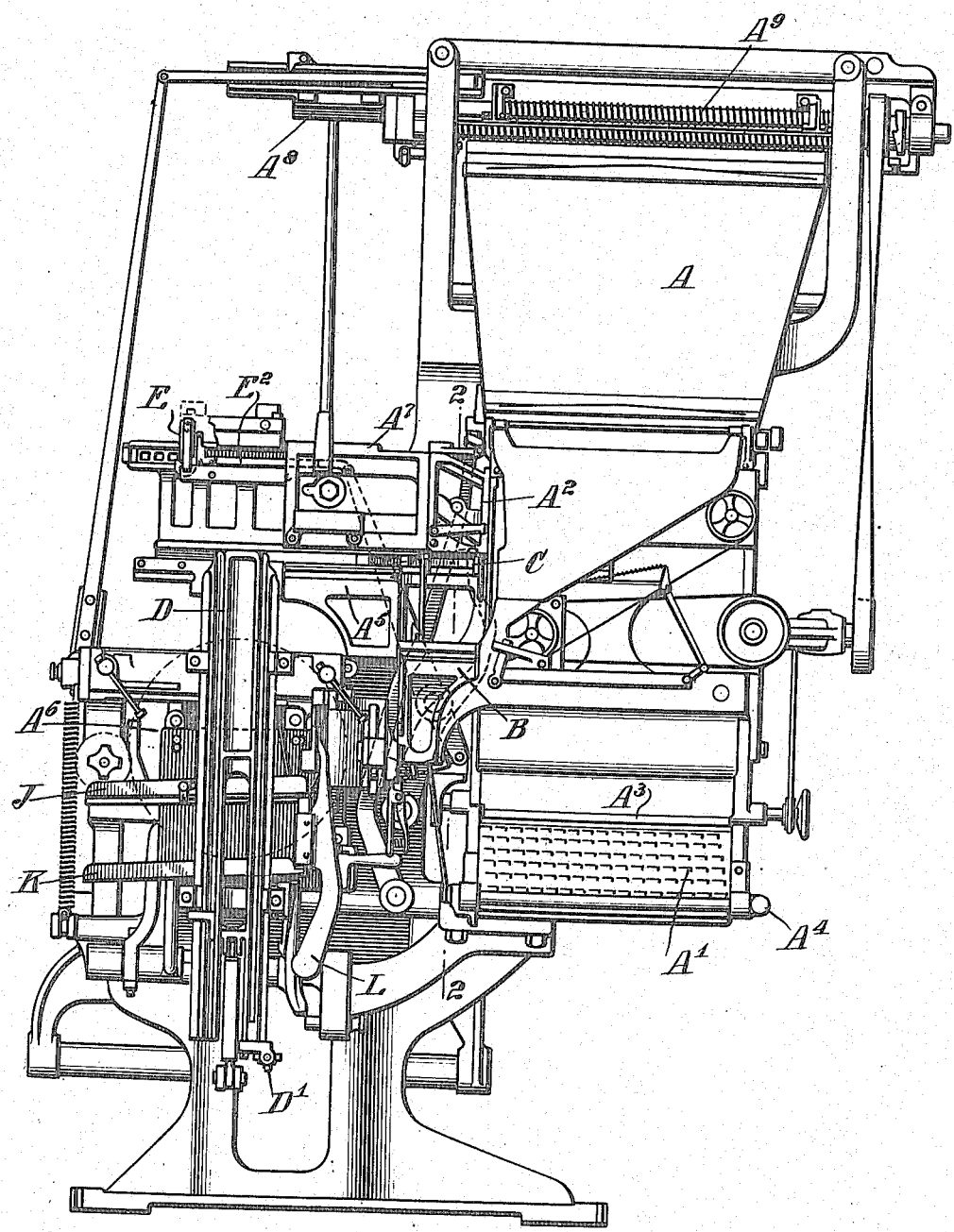

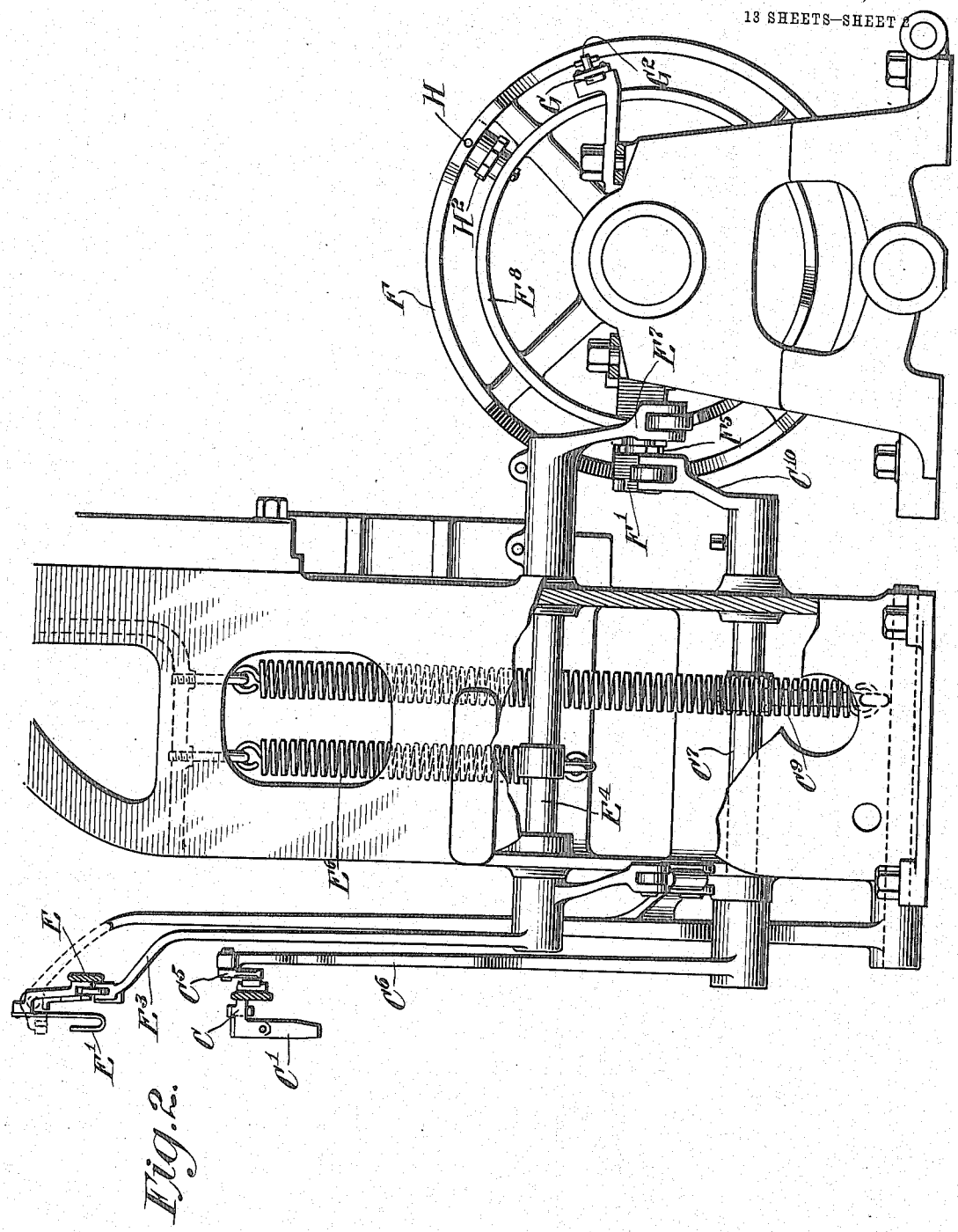

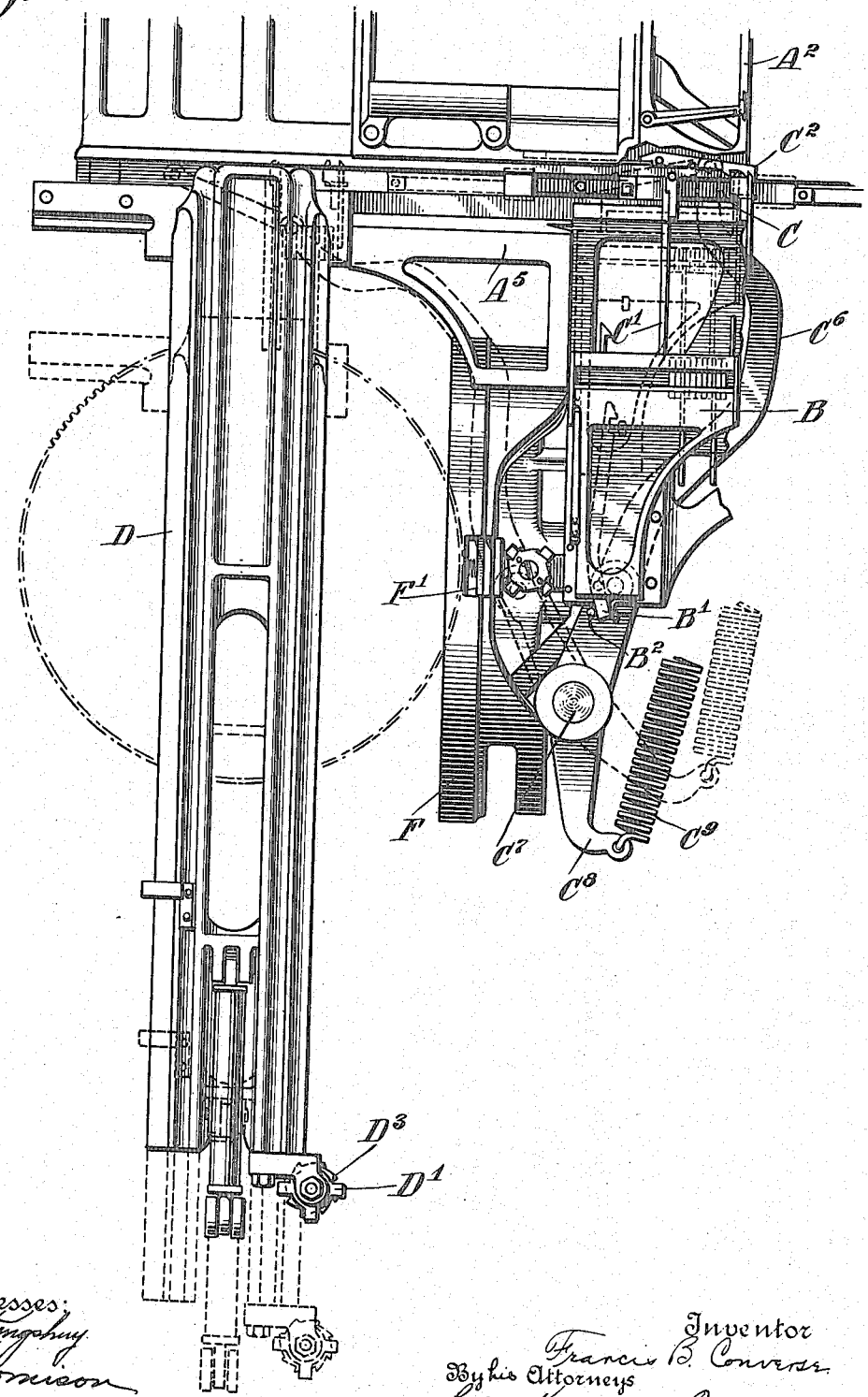

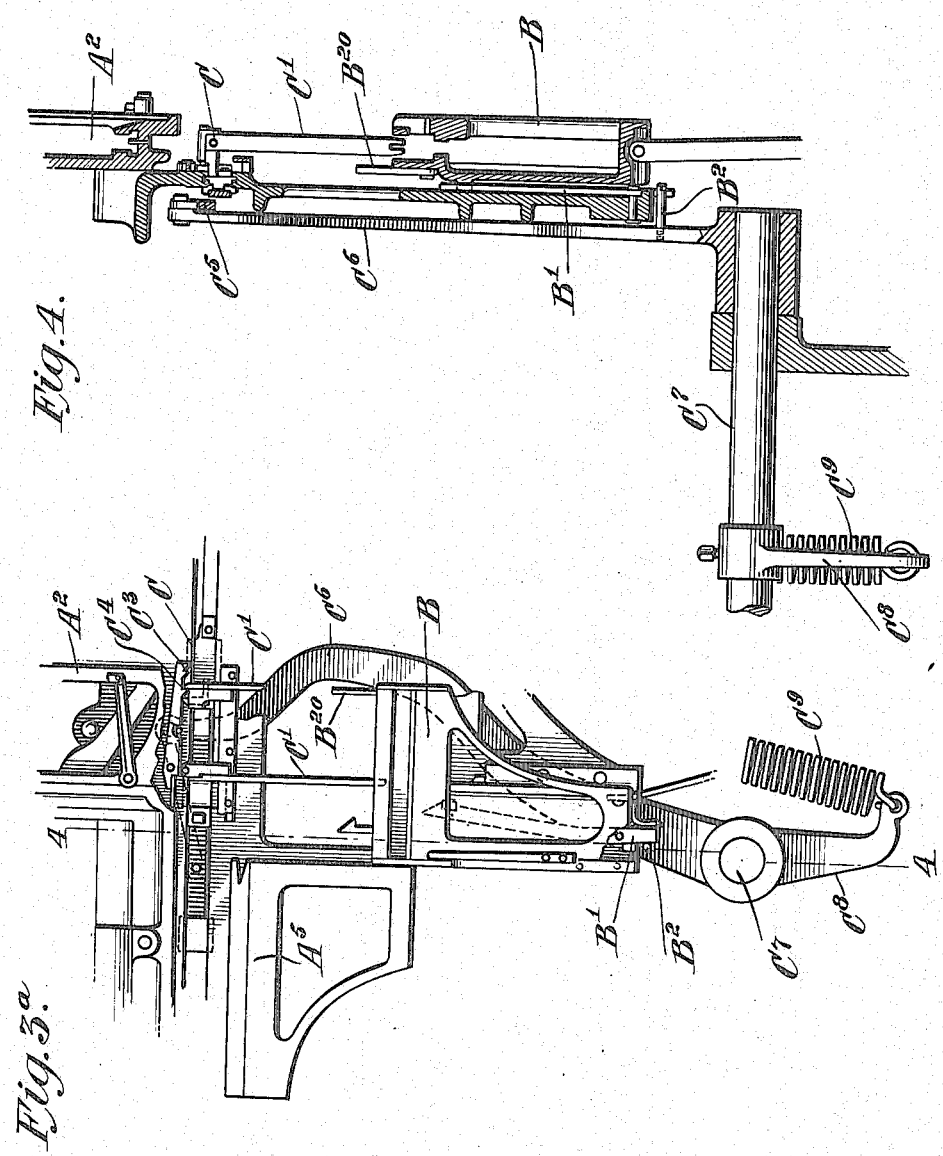

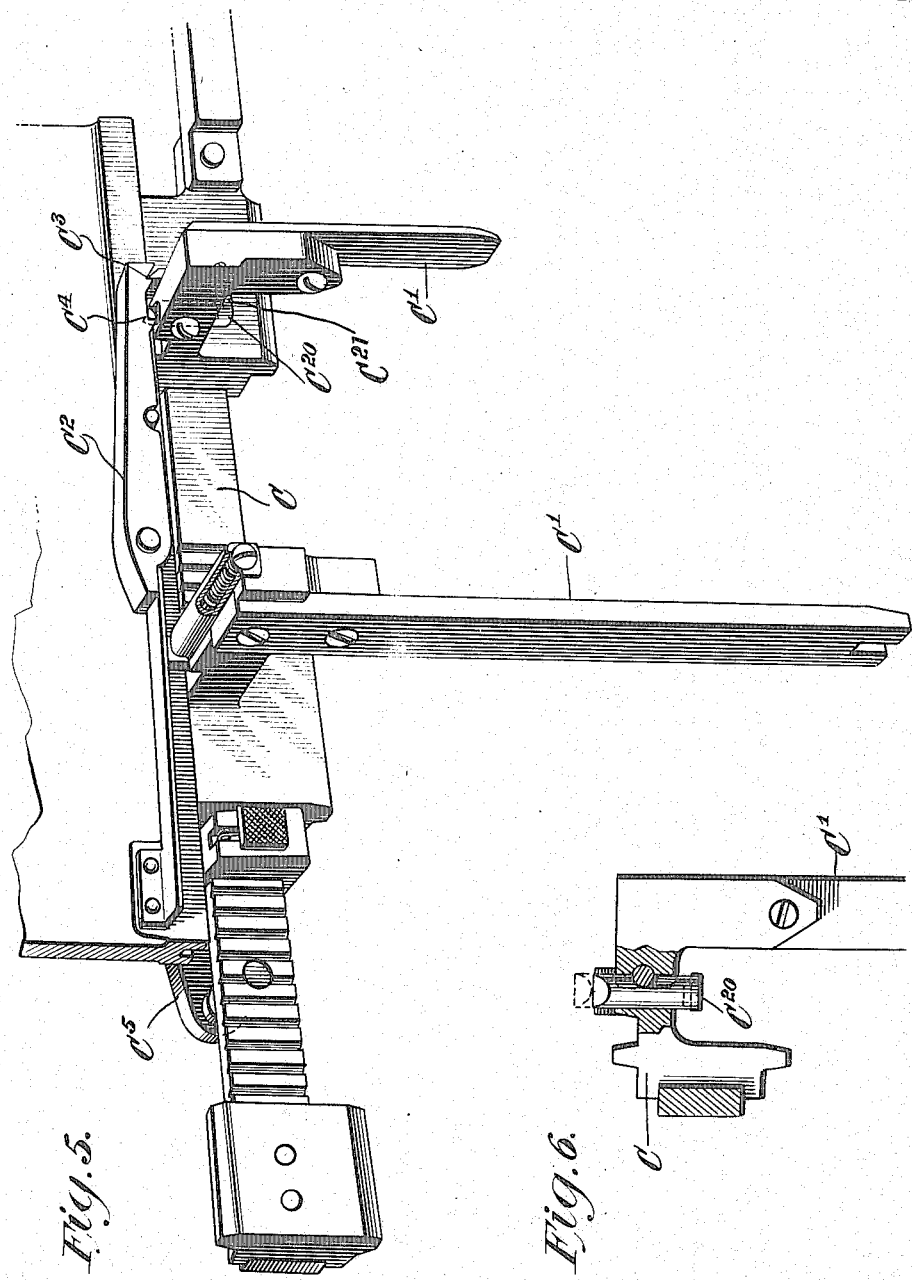

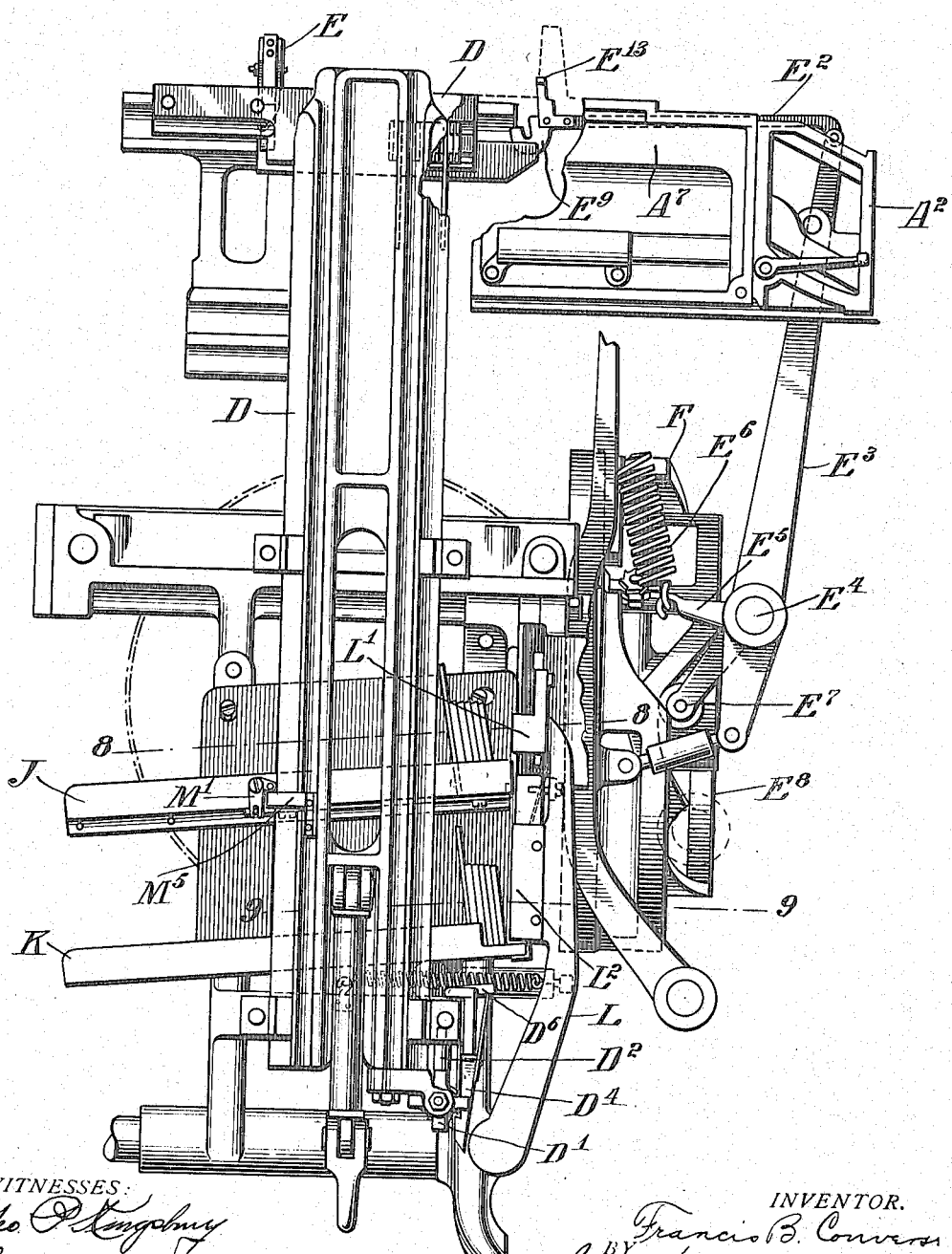

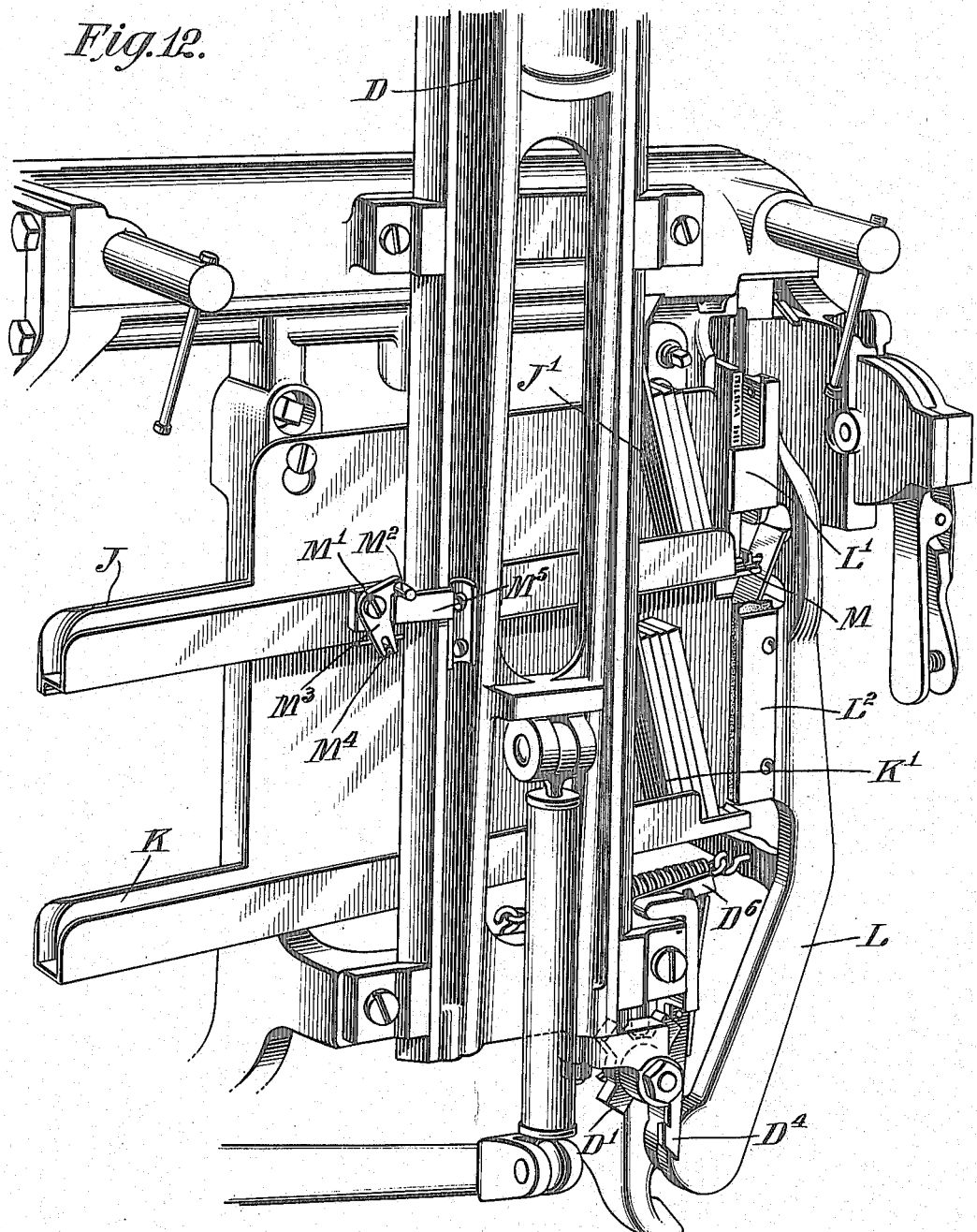

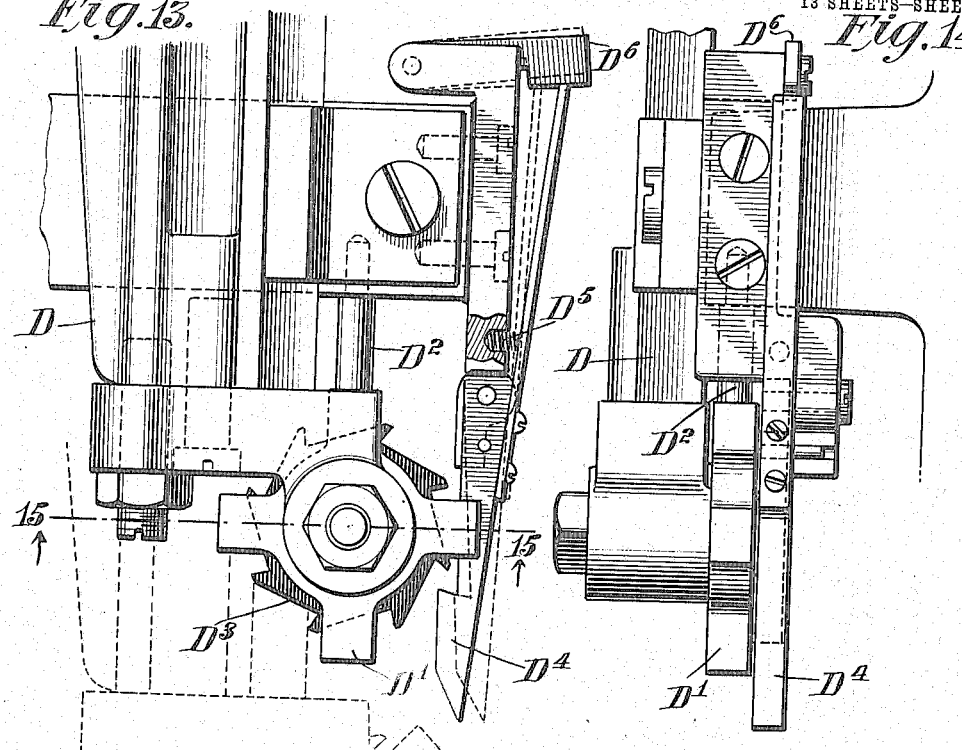
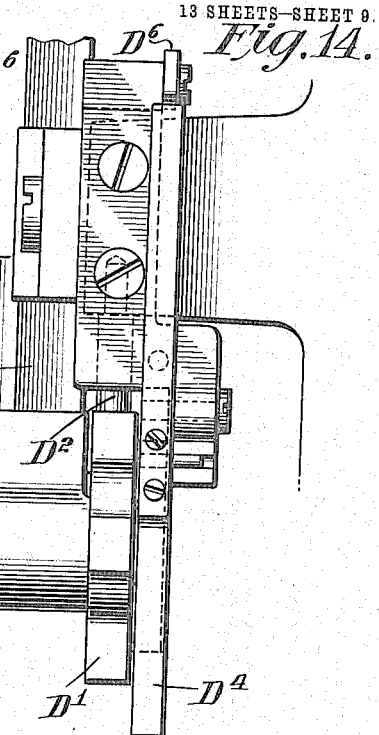
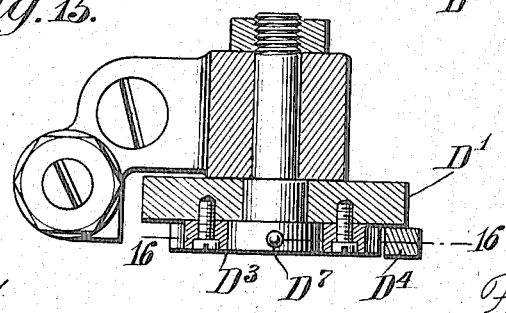

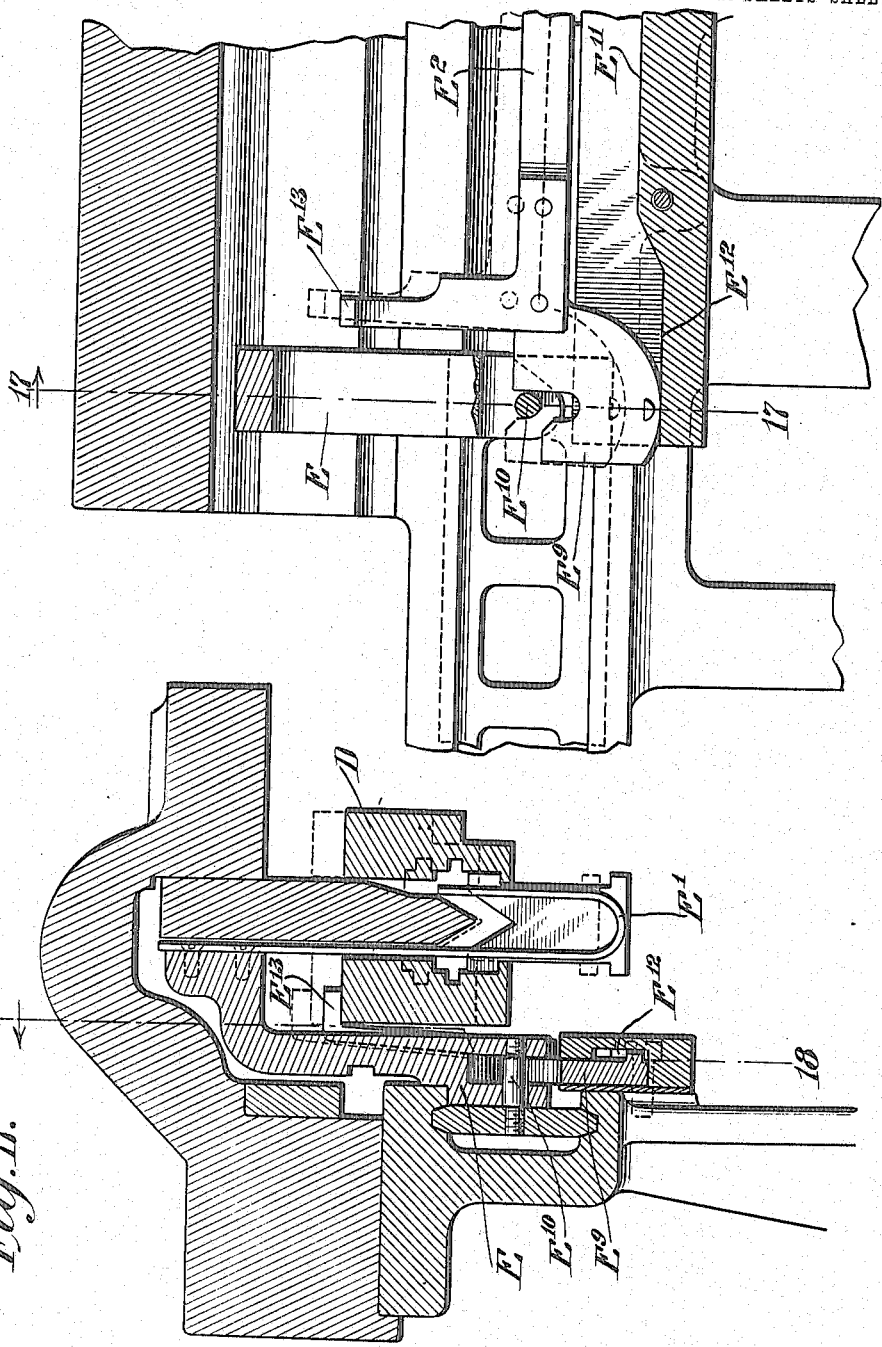

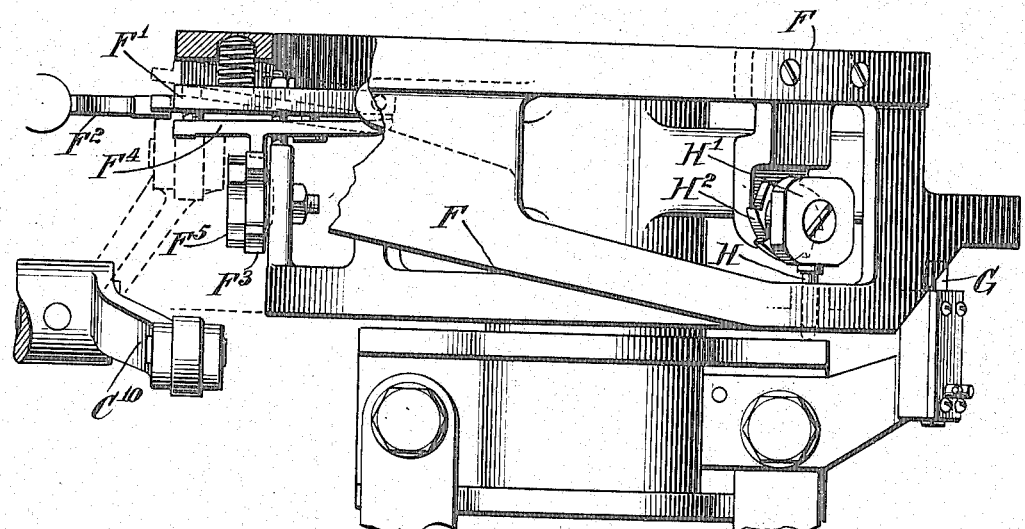
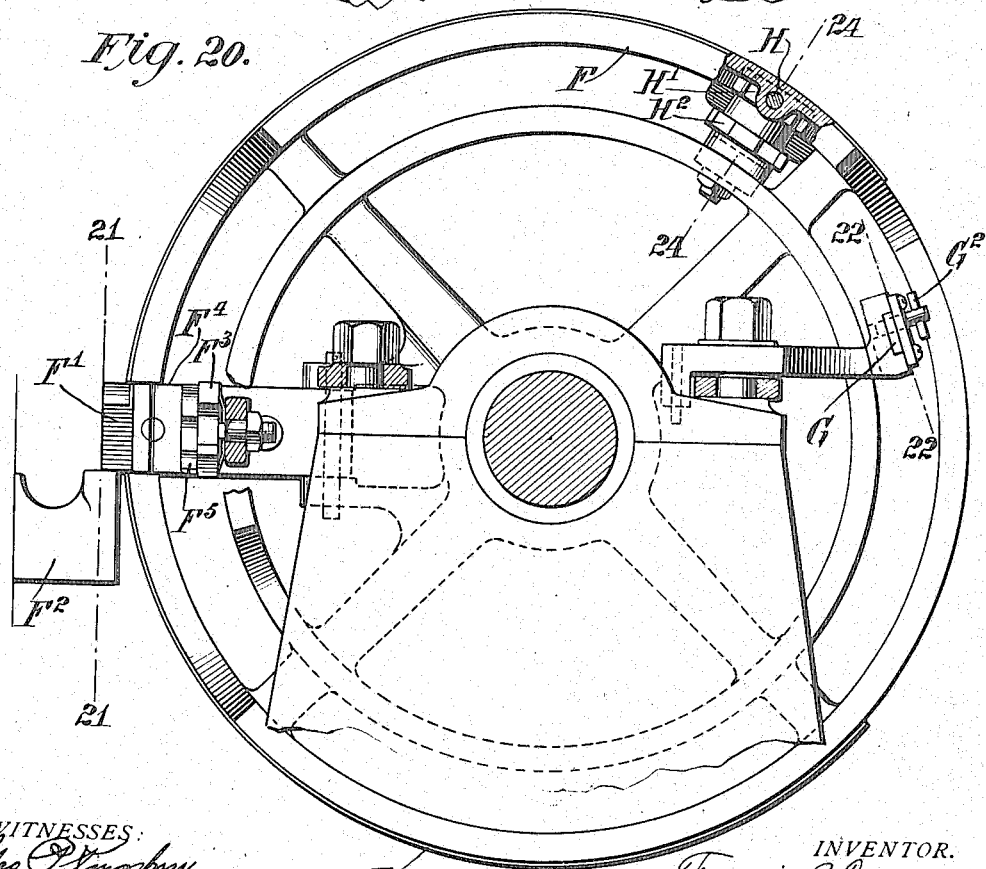

F. B. CONVERSE.
TYPOGRAPHICAL MACHINE.
APPLICATION FILED JAN. 21, 1914.

1,129,851.

Patented Mar. 2, 1915.
13 SHEETS—SHEET 12.

WITNESSES:
Geo. P. Kimpshur
L. E. Morrison

INVENTOR
Francis B. Converse
BY
Rogers, Kennedy & Campbell
His ATTORNEYS

UNITED STATES PATENT OFFICE.

FRANCIS B. CONVERSE, OF AKRON, OHIO, ASSIGNOR TO MERGENTHALER LINOTYPE COMPANY, A CORPORATION OF NEW YORK.

TYPOGRAPHICAL MACHINE.

1,129,851.   Specification of Letters Patent.   Patented Mar. 2, 1915.

Application filed January 21, 1914. Serial No. 813,408.

*To all whom it may concern:*

Be it known that I, FRANCIS B. CONVERSE, a citizen of the United States, residing at Akron, in the county of Summit and State of Ohio, have invented certain new and useful Improvements in Typographical Machines, of which the following is a specification, reference being had therein to the accompanying drawing.

My invention relates to typographical machines, such as linotype machines of the general organization represented in Letters Patent of the United States, No. 436,532, to O. Mergenthaler, wherein circulating matrices are released from a magazine in the order in which their characters are to appear in print, and then assembled in line together with spacers, the composed line transferred to the face of a mold, the mold filled with molten metal to form a slug or linotype against the matrices which produce the type characters thereon, and the matrices and spacers thereafter returned through distributing mechanism to the magazines from which they started. More particularly, it relates to machines of this kind when equipped and adapted to cast successively and automatically a plurality of duplicate slugs from the same matrix line; but, although the improvements are particularly adapted for employment in the manner specified, it should be noted that they are not limited thereto and are capable also of other uses.

In the accompanying drawings, I have shown my invention in preferred form and by way of example, and as applied to the specific style of machine mentioned, but obviously many changes and variations may be made therein, and in its mode of application, which will still be comprised within its spirit. Generally speaking, I desire it to be understood that I do not limit myself to any specific form or embodiment, except in so far as such limitations are specified in the claims.

Figure 21:
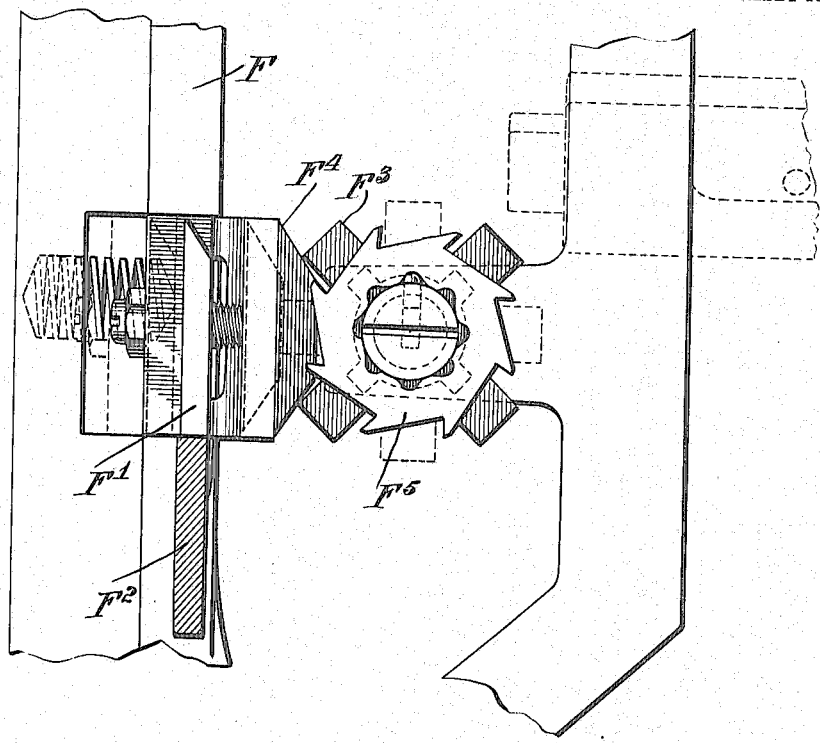
Figure 22:
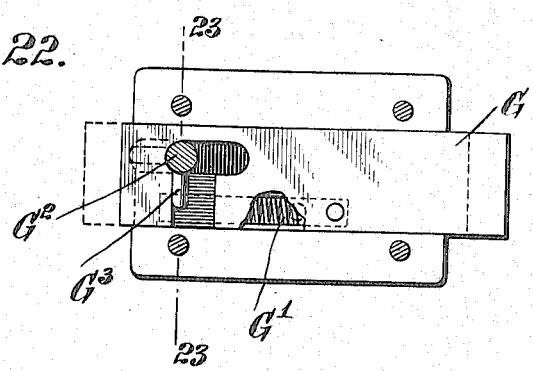
Figure 23:
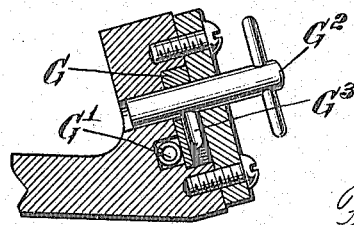
Figure 24:
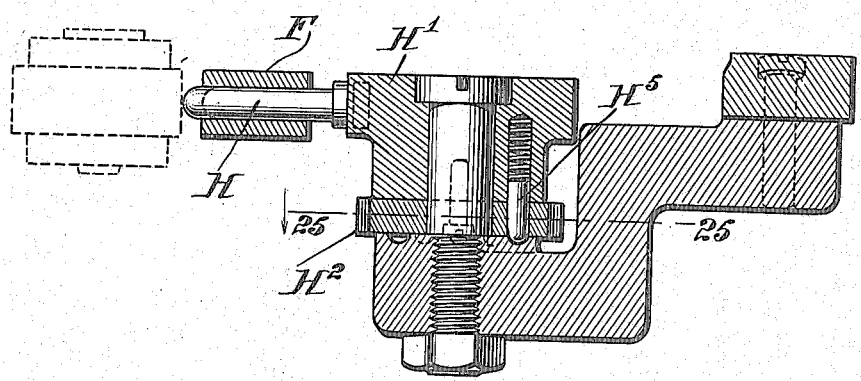
Figure 25:
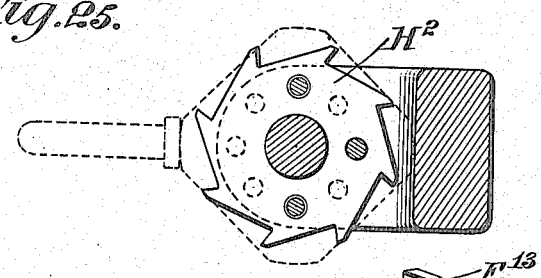
Figure 26:
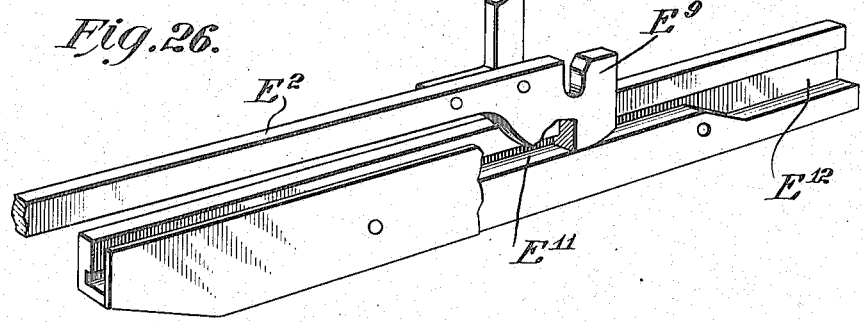

In the drawings: Figure 1 is a front elevation of a linotype machine, having my improvements embodied therein; Fig. 2 is a vertical section on the line 2—2 of Fig. 1; Fig. 3 is a front elevation of the assembler, first elevator, etc.; Fig. 3$^a$ is a front elevation of the assembler, etc.; Fig. 4 is a vertical section on the line 4—4 of Fig. 3$^a$; Fig. 5 is a perspective view of the line-delivery slide; Fig. 6 is a transverse sectional detail thereof; Fig. 7 is a front elevation of the first elevator, upper transfer channel, transfer mechanism, etc.; Fig. 8 is a horizontal section on the line 8—8 of Fig. 7; Fig. 9 is a similar section on the line 9—9 of Fig. 7; Fig. 10 is a vertical section on the line 10—10 of Fig. 8; Fig. 11 is a vertical section on the line 11—11 of Fig. 8; Fig. 12 is a perspective of the galleys, slug-delivering mechanism, etc.; Fig. 13 is a detail front elevation of the means for arresting the first elevator in abnormal position; Fig. 14 is a side elevation thereof; Fig. 15 is a horizontal section on the line 15—15 of Fig. 13; Fig. 16 is a sectional detail on the line 16—16 of Fig. 15; Fig. 17 is a vertical section through the transfer slide, etc. on the line 17—17 of Fig. 18; Fig. 18 is a similar section on the line 18—18 of Fig. 17; Fig. 19 is a plan view of the line-delivery cam, etc., partly broken away; Fig. 20 is a side view of the cam, partly in section; Fig. 21 is a vertical section on the line 21—21 of Fig. 20; Fig. 22 is a transverse section on the line 22—22 of Fig. 20; Fig. 23 is a transverse section on the line 23—23 of Fig. 22; Fig. 24 is a transverse section on the line 24—24 of Fig. 20; Fig. 25 is a horizontal section on the line 25—25 of Fig. 24; and Fig. 26 is a perspective rear detail of the transfer mechanism.

Referring to Fig. 1, when the machine is employed in the customary manner, that is to say to produce a single slug from each matrix line, the matrices are released from the magazine A by the keyboard mechanism A$^1$, and the spacers from their magazine A$^2$ by the key A$^3$, and are delivered to the assembler B. The assembler is then manually elevated by the handle A$^4$ and trips the delivery slide C, whereby the composed line is transferred from the assembler through the intermediate channel A$^5$ to the first elevator or line transporter D. The elevator then descends and moves the line into operative relation to the casting mechanism A$^6$, where it is justified, after which the slug is formed, trimmed, and delivered to the galley J. The elevator ascends to its uppermost position, and the line is removed therefrom by the slide E to the transfer channel $A^7$, from which the spacers are returned to their magazine $A^2$, and the matrices are lifted by the second elevator $A^8$ and delivered to the distributing mechanism $A^9$, whereby they are restored to their proper channels in the magazine A. The parts so far described, and their normal mode of operation in casting single slugs, in themselves constitute no part of my present invention, and are or may be of any suitable construction, such for instance as disclosed in the previously-mentioned Letters Patent, or as presented in the commercial linotype machine.

As already stated, my improvements are particularly applicable, when it is desired to cast duplicate slugs from the same matrix line, automatically and successively and without requiring special attention on the part of the operator. To this end, I employ means, which may be called into action at will, whereby the transfer slide E is operated only at alternate ascents of the elevator D, so as to permit the composed line to be returned a second time to the casting mechanism. These means comprise actuating devices for the transfer slide, which are preferably controlled by the position of the elevator itself, and the latter is provided with devices to arrest it alternately in an abnormal position, when desired. In other words, when the elevator rises into operative relation to the upper transfer channel $A^7$, the slide E is permitted to operate in the usual manner; but when it is held against its extreme upward movement, the slide remains at rest. This feature may be availed of also for other purposes, in that the actuation of the transfer means is made to depend upon the correct operative relation of the elevator to the other parts. I also employ means to lock the assembler against movement during the casting of the duplicate slug, thus preventing the delivery of a new line at an improper time. These locking means are automatically controlled and are released at the right moment by the delivery arm, which acts to unlock the assembler only when it is in its extreme outward position. I therefore also provide actuating means for the delivery arm which, when desired, move it alternately to this extreme position and to an abnormal or intermediate position. These means comprise a cam, the effective portion of which is varied by a pin or element which is alternately projected beyond and withdrawn beneath its active face. And I also employ devices to hold the delivery arm in its abnormal or intermediate position and thus prevent its useless movement during the casting of the duplicate slug. It is also necessary that the automatic operation of the machine be continued through a plurality of revolutions, instead of one, as in the ordinary use of the machine, and to that end I arrange the parts so that they are not arrested at the end of the first cycle, but proceed through an additional cycle or cycles, all in the manner subsequently to be described.

The machine is equipped with a plurality of galleys to receive the duplicate slugs, and the mechanism for delivering the slugs successively to the proper ones is also controlled by the movement of the first elevator to different positions as hereinbefore mentioned.

The means whereby the first elevator D is arrested alternately in normal position in registry with the upper transfer channel $A^7$, and in an abnormal or lower position, comprise (Figs. 1, 3, 7, 12, 13, 14, 15 and 16) the rotatably mounted star wheel $D^1$, connected to the elevator near its lower end, the star wheel being formed with a series of projecting arms and intermediate spaces or hollows. Mounted upon the vise-frame and above the star wheel $D^1$ is the pin or stop $D^2$ (Figs. 13 and 14), the parts being so located that when one of the arms of the wheel $D^1$ is uppermost, the ascending elevator will bring it into contact with the stop pin, and when the wheel is so turned as to present one of the intermediate spaces, the pin will enter the space; that is to say, under the latter conditions the elevator will ascend to its uppermost or operative position, and under the former will be arrested in lower or abnormal position. Connected to the star wheel is the ratchet $D^3$, adapted to be engaged and turned by a pawl $D^4$, as the elevator descends. The pawl $D^4$, is pivoted to the vise-frame and is normally pressed inwardly into engaging position by the spring $D^5$, and is held in its outer or inoperative position by the catch $D^6$. When the machine is operating in the ordinary manner, the pawl is held out of action by the catch, and the elevator rises each time to its full extent; but when it is desired to cast duplicate slugs, it is freed from the catch, and the star wheel is rotated, thus effecting the ascent of the elevator alternately to its uppermost and abnormal positions. To hold the star wheel and ratchet securely in their several operative relations, a spring-pressed plunger $D^7$ (Fig. 16) is provided, adapted to engage suitably located depressions in the rotating parts.

As previously stated, in order to permit the casting of duplicate slugs, it is necessary that the matrix line in the first elevator remain therein and descend again into relation to the casting mechanism, and this result is secured by the alternate connection and disconnection of the actuating means for the transfer slide. The slide E is provided with the usual depending finger $E^1$ adapted to pass through the elevator D and transfer the matrix line therefrom into the upper transfer channel $A^7$, and the means for imparting movement to the slide comprise (Figs. 1, 2, 7, 17, 18 and 28) the link $E^2$ and the arm $E^3$ mounted upon the rock shaft $E^4$. A second arm $E^5$ is mounted on the rock shaft and connected thereto is the spring $E^6$, which acts to move the slide operatively; and also mounted on the rock shaft is an arm $E^7$, engaging and controlled by the cam $E^8$, whereby the slide is restored to normal position.

In the ordinary arrangement of the machine, the slide E is timed to operate at each ascent of the elevator D, but in the present instance the link $E^2$ is detachably connected to the slide, and so that the latter will not be actuated when the elevator is arrested in a lower position. The link $E^2$ at its inner end is formed with a hook-like portion $E^9$, adapted to engage the transverse pin $E^{10}$ carried by the slide. The link is guided in its reciprocating motion in the horizontal groove $E^{11}$, which near its inner end is cut away or formed with a depression $E^{12}$, so as to permit the hook to drop and disengage from the pin, unless sustained by other means. The link is therefore formed with an arm $E^{13}$ projecting laterally into the path of the elevator D, so that when the elevator rises to its uppermost or operative position, the arm will be engaged thereby and the hook $E^9$ held in engagement with the pin $E^{10}$ (as shown by dotted lines in Figs. 17 and 18), in which condition of the parts the slide E will be actuated in the ordinary manner. But if the elevator fails to rise to the full extent, the hook is disengaged from the pin (as shown by full lines in Figs. 17 and 18), and the outward movement of the link is without effect upon the slide. It will also be seen that these means may be availed of for other purposes, such as to prevent the actuation of the transfer devices unless the several parts are in correct operative relation.

As before outlined, when the assembler B is raised, it introduces the composed line between the fingers $C^1$, $C^1$ of the delivery slide C, and also trips the latter, thus permitting it to convey the line through the intermediate channel $A^5$ into the elevator D. These parts are best illustrated in Figs. 2, 3, $3^a$, 4, 5 and 6. The slide C is connected by the link $C^5$ to the actuating arm $C^6$ mounted upon the rock shaft $C^7$, which is also provided with an arm $C^8$ connected to a spring $C^9$, whereby the slide is moved operatively, and with an arm $C^{10}$ engaging the cam F, whereby the slide is moved in the opposite direction to normal position. When the slide is released and the spring $C^9$ permitted to act, the arm $C^{10}$ also trips the starting dog $F^1$ and initiates the automatic operation of the machine, as will be hereinafter referred to. When the cam F restores the slide to normal position, the latter is held by the customary pivoted pawl $C^2$, formed with a notch $C^3$ to engage a detent on the slide. In the present instance the pawl is also formed with a second notch $C^4$, adapted to engage the slide in an intermediate position, as will be subsequently explained.

In order to prevent the elevation of the assembler B, and the delivery of another composed line therefrom, before the duplicate slug is cast, the assembler is provided with a spring-pressed latch $B^1$ adapted to engage a projection on the fixed frame, as best shown by dotted lines in Figs. 3 and $3^a$. When the latch is in its engaging position (Fig. $3^a$), the assembler is held against movement, and to effect the unlocking of the assembler at the proper time, the arm $C^6$ is formed with the pin $B^2$ adapted to engage the lower end of the latch. In the ordinary use of the machine, the return movement of the arm $C^6$ would effect the release of the latch at each operation; and therefore, in order to effect the alternate locking and unlocking of the assembler, I provide means whereby the arm is successively moved to its extreme outer position (Fig. 3) to release the latch, and to an intermediate position (Fig. $3^a$) wherein the latch is not affected.

As previously stated, the arm $C^6$ is moved outwardly by the cam F, and in order to secure the different extents of movement above mentioned, I provide the active surface of the cam with a pin H (see Figs. 2, 19, 20, 24 and 25) which may be projected therefrom or withdrawn, and thus vary its effective throw. The cam F is provided, interiorly and in proximity to the head of the pin H, with a rotatable plate or cam piece $H^1$, formed with alternate surfaces of different radii, one series of which is adapted to project the front of the pin beyond the active surface of the cam F, and the other of which permits its withdrawal below such active surface. Connected to the cam piece $H^1$ is the ratchet $H^2$, located in proper position to engage the pawl G mounted on the main frame, as the cam F rotates. The ratchet $H^2$ has its teeth so formed and arranged that their engagement with the pawl rotates the cam piece $H^1$ with relation to the pin H, so that its alternate surfaces are brought into operation, or in other words, so that successive movements of the cam piece alternately project the pin beyond the active surface of the cam F and permit its withdrawal from its projected position. In this way the effective contour of the cam is varied, so that in its successive rotations, the arm $C^6$ is first moved to its extreme outward position, and then to an intermediate position, and correspondingly the assembler B is unlocked or locked. The cam piece $H^1$ and connected ratchet $H^2$ (Fig. 24) are provided with a spring-pressed plunger H⁵ adapted to engage suitable depressions in the frame-work of the cam F, to hold the cam piece in its several operative positions.

The previously-mentioned formation of the pawl C² (Fig. 5) with two holding notches C³ and C⁴, insures the retention of the slide C in both positions of the arm C⁶, the extreme position being shown in Fig. 3, and the intermediate position in Fig. 3ª. As shown in Figs. 5 and 6, the slide C is provided with a disengaging pin C²⁰, which is somewhat different from the ordinary construction. This pin is movably mounted in the slide, and is formed at its under side with an extended arm or member C²¹, which is adapted to be engaged by the tripping pin B²⁰ on the assembler B, in either position of the slide C.

The pawl G is adjustably mounted in the stationary framework (Figs. 2, 19, 20, 22 and 23), it being normally pressed forward into operative position by the spring G¹, and being under the control of the handle G² formed with the finger G³, which engages the pawl, and permits its projection into or withdrawal from operative position as desired. In the normal use of the machine, the pawl is withdrawn out of the path of the ratchet H².

In ordinary use, the automatic operations complete a single cycle, and the machine comes to rest; but, when it is desired to cast duplicate slugs from the same matrix line, these operations should continue through a corresponding plurality of cycles, and this end I secure by devices next to be described. As before stated, the machine is started upon the tripping of the dog F¹ by the arm C¹⁰ of the line-delivery means. Referring to Figs. 2, 3, 19, 20 and 21, the dog F¹ is mounted at the side of the cam F, and is spring-pressed laterally so as normally to engage and depress the yielding slide F², which controls the clutch devices. The particular form of these devices in themselves constitutes no part of my present invention, they being of well known construction and embodied in the commercial linotype machine. In the ordinary mode of use, after the dog is freed from the slide F², and the machine is started, the dog is at once restored to normal position by its spring, and at the end of the cycle, it again contacts with the slide, depressing it and arresting the machine. I have therefore provided means, so that in the event that it is desired to cast duplicate slugs, the dog will be held in inoperative position and so as not to contact with the slide, until the desired number of cycles be completed. These means comprise the rotatable star or cam wheel F³, mounted interiorly of the cam F and in engaging proximity to a member F⁴ connected to the dog F¹, the member F⁴ being formed with inclined surfaces adapted to be engaged by the arms of the star wheel. When the member F⁴ rests between the arms of the star wheel, the dog occupies its active position, as shown by full lines in Fig. 21; and when an arm of the star wheel is brought into engagement with the member F⁴, the dog is moved to inoperative position, as shown by dotted lines in Fig. 21. For instance, if the machine is arranged to cast two slugs from a matrix line, and after the dog F¹ has been tripped, it will be held by the engagement of an arm of the star wheel with the member F⁴, and the cam F will consequently commence a second rotation, during which the arm of the star wheel is moved out of engagement with the member F⁴, when the dog returns to its normal or engaging position in relation to the slide F². In this way, the repeated performance of the automatic operations is secured, without requiring attention or effort on the part of the operator.

The means for securing the automatic rotation of the wheel F³ comprise the connected ratchet F⁵, which is so located as to be engaged by the previously-mentioned pawl G, when the latter is adjusted to active position. In other words, the setting of this pawl effects both the rotation of the ratchet H² and the projection of the pin H, and also the rotation of the ratchet F⁵ and the control of the dog F¹.

When the machine is operating normally, the slugs are delivered to the galley J, and are stacked therein against the resistant J¹ by the slug-shifter L, which is moved in the ordinary manner. When, however, duplicate slugs are to be cast, it is necessary that they be successively delivered to different galleys, and therefore I employ a second one K beneath the other, and have provided the upper galley J with a movable gate M, which is controlled as to its action by the previously-described different movements of the elevator D. These means are best shown in Figs. 1, 7, 8, 9, 10, 11 and 12. The gate M is slidingly connected to the bottom of the galley J, so that its end may be projected beyond it to arrest a delivered slug, or be withdrawn to permit the passage of the slug to the galley K.

The actuating means for the slide M comprise the elbow lever M¹ pivoted to the side of the galley J and provided at one end with a pin M² located in the path of the piece M⁵ connected to the elevator D, and formed at its other end M³ to engage a pin or projection M⁴ on the slide. These parts are so arranged that when the elevator rises to its full extent, the piece M⁵ will contact with the pin M² and project the slide M beyond the end of the galley J, so as to arrest the slug. When the elevator descends, the piece M⁵ moves out of contact with the pin M², and the advance of the shifter arm L not only moves the slug into the galley J, but also through its engagement with the end of the slide M restores the latter to normal position. This is the regular operation, when the machine is casting single slugs.

When it is desired to cast duplicate slugs, and when because of the release of the pawl D⁴, the elevator is caused to be arrested alternately in different positions, the projection M⁵ will contact with the pin M² only at alternate ascents of the elevator, and consequently the gate M will be alternately projected. In other words, when the elevator rises to its full extent, the slugs will be delivered to the galley J, and when arrested in its lower position, the slugs will pass on downward to the galley K. It will be understood that the galley K is provided with the usual resistant K¹, and that the shifter L is formed with suitable means L¹ and L² to advance the slugs in both galleys.

The general operation of the machine has already been sufficiently indicated by the previous detail description. It may be noted, however, that the only adjustment required to convert the machine into a duplicate caster is (a) the release of the pawl D⁴ from the catch D⁶ to permit its engagement with the ratchet D³, (b) the manipulation of the handle G² to project the pawl G into the path of the ratchets F⁵ and H², to control respectively the position of the starting dog F¹, and the projection of the pin H, and (c) the turning of the cam H¹ to insure the initial position of the pin H within the active surface of the cam F.

In the accompanying drawings and description, I have presented my improvements in a form adapted to produce two slugs from any given matrix line, but obviously the devices may be suitably varied to produce a greater or any feasible number of such duplicates. Further, it is evident that the several improvements entering into the general organization, are capable of wider application and other uses than those specifically outlined. Many modifications and alterations therein, and in their mode of adaptation and employment, will suggest themselves to those skilled in the art, without departure from the scope of the invention.

Having thus described my invention, its construction and mode of operation, what I claim and desire to secure by Letters Patent of the United States, is as follows:

1. In a typographical machine, the combination of a movable line transporter, a transfer device to remove the line therefrom, and operating means normally disconnected from the transfer device and adapted to be connected thereto by the movement of the transporter.

2. In a typographical machine, the combination of a line transporter, means acting in the regular operation of the machine to cause the transporter to move to different extents in its successive operations, a transfer device to remove the line from the transporter, and means for permitting or preventing the operation of said device according to the extent of movement of the transporter.

3. In a typographical machine, the combination of a line transporter movable to different extents, a transfer device to remove the line from the transporter, and operating means therefor adapted to be connected to or disconnected from the transfer device according to the extent of movement of the transporter.

4. In a typographical machine, the combination of a movable line transporter, a transfer device to remove the line therefrom, actuating means therefor, and automatic mechanism whereby the actuating means are alternately connected to and disconnected from the transfer device in the successive operations of the transporter.

5. In a typographical machine, the combination of a movable line transporter, a transfer device to remove the line therefrom, actuating means therefor, and automatic mechanism whereby the actuating means are alternately connected to and disconnected from the transfer device in the successive operations of the transporter, together with means for preventing the action of said mechanism, at will.

6. In a typographical machine, the combination of a movable line transporter, a transfer device for removing the line from the transporter, means for preventing the action of said transfer device and adapted to be rendered inactive by the full movement of the transporter, and automatic mechanism acting in the regular operation of the machine to limit the movement of the transporter in its alternate operations.

7. In a typographical machine, the combination of a movable line transporter, a transfer device for removing the line from the transporter, means for preventing the action of said transfer device and adapted to be rendered inactive by the full movement of the transporter, and automatic mechanism acting in the regular operation of the machine to limit the movement of the transporter in its alternate operations, together with means for preventing the action of said mechanism at will.

8. In a typographical machine, the combination of a movable line transporter, and automatic mechanism acting in the regular operation of the machine to vary the extent of movement of the transporter at predetermined intervals.

9. In a typographical machine, the combination of a movable line transporter, and automatic mechanism acting in the regular operation of the machine to vary the extent of movement of the transporter at predetermined intervals, together with means for preventing the action of said mechanism at will.

10. In a typographical machine, the combination of a movable line transporter, and mechanism for arresting the movement of the transporter, said mechanism comprising a stop device which is shifted alternately into and out of operative position at regular intervals in the regular operation of the machine.

11. In a typographical machine, the combination of a movable line transporter, and mechanism for arresting the movement of the transporter, said mechanism comprising a rotary star wheel carried by the transporter, and means for rotating said star wheel into and out of arresting position alternately.

12. In a typographical machine, the combination of a movable line transporter, and mechanism for arresting the movement of the transporter, said mechanism comprising a rotary star wheel carried by the transporter, and pawl-and-ratchet connections for rotating it into and out of arresting position alternately, together with means for breaking said connections at will.

13. In a typographical machine, the combination of a line transporter movable vertically, and mechanism for arresting the upward movement of the transporter, said mechanism comprising the rotary star wheel $D^1$ carried by the transporter, the ratchet $D^3$ secured to the star wheel, and the pawl $D^4$ to engage the ratchet, for the purpose described.

14. In a typographical machine, the combination of a line transporter movable vertically, and mechanism for arresting the upward movement of the transporter, said mechanism comprising the rotary star wheel $D^1$ carried by the transporter, the ratchet $D^3$ secured to the star wheel, and the pawl $D^4$ to engage the ratchet, together with the latch $D^6$ for holding the pawl out of engaging position, all for the purpose described.

15. In a typographical machine, the combination of a movable line transporter, and means whereby said transporter is caused to move to the same extent or to different extents in its successive operations in the regular operation of the machine.

16. In a typographical machine, the combination of a line transporter movable to the same extent or to different extents in its successive operations in the regular operation of the machine, a transfer device to remove the line from the transporter, and means for permitting or preventing the operation of said device according to the extent of movement of the transporter.

17. In a typographical machine comprising casting mechanism, the combination of driving mechanism including a rotary wheel provided with a clutch-controlling dog, and automatic mechanism for preventing the action of said dog at successive rotations of the wheel, for the purpose described.

18. In a typographical machine comprising casting mechanism, the combination of driving mechanism including a rotary wheel provided with a clutch-controlling dog, and automatic mechanism for preventing the action of said dog at successive rotations of the wheel, together with means for rendering said mechanism inactive at will, for the purpose described.

19. In a typographical machine comprising casting mechanism, the combination of driving mechanism including a rotary wheel provided with a clutch-controlling dog, automatic mechanism comprising a rotary star wheel for throwing said dog out of action, and means for rotating said star wheel periodically, for the purpose described.

20. In a typographical machine comprising casting mechanism, the combination of driving mechanism including a rotary wheel provided with a clutch-controlling dog, automatic mechanism comprising a rotary star wheel for throwing said dog out of action, and pawl-and-ratchet connections for rotating said star wheel periodically, for the purpose described.

21. In a typographical machine comprising casting mechanism, the combination of driving mechanism including the wheel F provided with the dog $F^1$, the star wheel $F^3$ for throwing the dog out of action at alternate rotations of the wheel F, the ratchet $F^5$ connected to the star wheel, and the pawl G mounted in the framework in position to engage the ratchet at each rotation of the wheel F, for the purpose described.

22. In a typographical machine comprising casting mechanism, the combination of driving mechanism including the wheel F provided with the dog $F^1$, the star wheel $F^3$ for throwing the dog out of action at alternate rotations of the wheel F, the ratchet $F^5$ connected to the star wheel, and the pawl G mounted in the framework and movable into and out of engaging relation to the ratchet, for the purpose described.

23. In a typographical machine comprising casting mechanism, the combination of driving mechanism including a rotary wheel F, a clutch-controlling dog, and automatic mechanism comprising a rotary star wheel carried by the wheel for throwing the dog out of action at alternate rotations of the wheel F, and means for rotating the star wheel periodically, for the purpose described.

24. In a typographical casting machine, comprising casting mechanism, the combination of driving mechanism including a rotary wheel provided with a clutch-controlling dog, and means for permitting or preventing the action of said dog at each rotation of the wheel, for the purpose described.

25. In a typographical machine, the combination of means for assembling matrices in line, casting mechanism adapted to produce successive slugs from the assembled line, and means for preventing the transfer of a second line from the assembling means until the casting mechanism has completed a duplicate slug from the previous line.

26. In a typographical machine, the combination of means for assembling matrices in line, casting mechanism adapted to produce successive slugs from the line, transfer devices for carrying the assembled lines from the assembling means to the casting mechanism, and means for preventing the action of the transfer devices until the casting mechanism has completed a duplicate slug from a given line.

27. In a typographical casting machine, the combination of casting mechanism adapted to produce successive slugs from the same matrix line, an assembler wherein the matrices are composed and movable to effect the delivery of the line to the casting mechanism, and means for preventing the movement of the assembler until the casting mechanism has completed a duplicate slug from the previous line.

28. In a typographical machine, the combination of an assembler wherein the matrices are composed, transfer devices for removing the lines from the assembler, and mechanism for preventing the transfer of the line until the machine has completed several cycles of operation.

29. In a typographical machine, the combination of an assembler wherein the matrices are composed, transfer devices for removing the line from the assembler, and mechanism for preventing the transfer of the line until the machine has completed several cycles of operation, together with means for rendering the said mechanism inactive at will.

30. In a typographical machine, the combination of a movable assembler, and mechanism for preventing the movement of the assembler until the machine has completed several cycles of operation.

31. In a typographical machine, the combination of a movable assembler, and mechanism for preventing the movement of the assembler until the machine has completed several cycles of operation, together with means for rendering said mechanism inactive at will.

32. In a typographical machine, the combination of an assembler wherein the matrices are composed, transfer devices for removing the line from the assembler, and automatic mechanism for alternately preventing and permitting the operation of the transfer devices as the machine completes its successive cycles of operation, together with means for rendering said mechanism inactive at will.

33. In a typographical machine, the combination of an assembler wherein the matrices are composed, transfer devices for removing the line from the assembler, and automatic mechanism for alternately preventing and permitting the operation of the transfer devices as the machine completes its successive cycles of operation.

34. In a typographical machine, the combination of a movable assembler, a locking device to prevent its movement, and line delivery means adapted to release said locking device, with mechanism for preventing such release until the machine has completed several cycles of operation.

35. In a typographical machine, the combination of a movable assembler, a locking device therefor, line transfer means adapted to release the locking device, a cam to control the movement of the transfer means, and automatic mechanism for causing said transfer means to release the locking device at alternate rotations of the cam.

36. In a typographical machine, the combination of a movable assembler, a locking device therefor, transfer means adapted to release the locking device, and the cam F to control the movement of the transfer means and provided with a periodically adjusted member H to effect the releasing action of the transfer means at alternate rotations of the cam.

37. In a typographical machine, the combination of a movable assembler, a locking device therefor, transfer means adapted to release the locking device, the cam F to control the movement of the transfer means, and automatic mechanism for effecting the releasing action of the transfer means at alternate rotations of the cam, the said mechanism comprising the rotatable plate H¹ carried by the cam, the ratchet H² secured to the plate, and the pawl G for rotating the ratchet periodically.

38. In a typographical machine, the combination of a movable assembler, a locking device therefor, transfer means adapted to release the locking device, the cam F to control the movement of the transfer means, and automatic mechanism for effecting the releasing action of the transfer means at alternate rotations of the cam, the said mechanism comprising the rotatable plate H¹ carried by the cam, the ratchet H² secured to the plate, and the pawl G mounted in the framework and movable into and out of engaging relation to the ratchet.

39. In a typographical machine, the combination of means for assembling matrices in line, casting mechanism, transfer devices for carrying the assembled line from the assembling means to the casting mechanism, and means for permitting or preventing the transfer of successive lines from the assembling means at each operation of the machine.

40. In a typographical machine, the combination of line delivery means and a single detent to hold said means in their normal position, said detent being formed to hold the delivery means also in an abnormal position.

41. In a typographical machine, the combination of line delivery devices, means for returning them to different positions, and means for holding the delivery devices in any of their different positions.

42. In a typographical machine, the combination of assembling means, line delivery devices to transfer the composed line therefrom and adapted to occupy different positions of rest, and automatic mechanism for returning them alternately to their different positions of rest.

43. In a typographical machine, the combination of assembling means, line delivery devices to transfer the composed line therefrom and adapted to occupy different positions of rest, and automatic mechanism for returning them alternately to their different positions of rest, together with means for rendering said mechanism inactive at will.

44. In a typographical machine, the combination of a movable assembler, and means for permitting or preventing the movement of the assembler at each operation of the machine.

45. In a typographical machine, the combination of assembling means, line delivery devices to transfer the composed line therefrom and adapted to occupy different positions of rest, and means for returning them to the same position or alternately to different positions of rest after each operation.

46. In a typographical machine, the combination of line delivery devices, means for returning said devices to different positions of rest, and means for tripping said devices in any position.

47. In a typographical machine, the combination of line delivery devices, and a simple detent to hold the devices in either one of two positions, and means for tripping the detent irrespective of the position of the line delivery devices.

48. In a typographical machine, the combination of the assembler B provided with the trip rod B²⁰, the slide C for removing the line therefrom, the detent C² to hold the slide in either one of two positions, and the pin C²⁰ mounted on the slide C to trip the detent C², and formed with a lateral extension to adapt it to be engaged by the trip rod B²⁰ in either position of the slide C.

49. In a typographical machine, the combination of the assembler B provided with the trip rod B²⁰, the slide C for removing the line therefrom, the detent C² to hold the slide in either one of two positions, and the pin C²⁰ mounted on the slide C to trip the detent C², and adapted to be engaged by the trip rod B²⁰ in either position of the slide C.

50. In a slug casting machine, the combination of a plurality of galleys, and means for delivering the slugs to one or another of the galleys, as required.

51. In a slug casting machine, the combination of a plurality of galleys, and means for delivering the successive slugs to different galleys.

52. In a typographical casting machine, the combination of casting mechanism wherein duplicate slugs are successively cast, a plurality of galleys, and means for delivering the duplicate slugs to different galleys.

53. In a slug casting machine, the combination of a movable line transporter, a plurality of galleys, and means for delivering the slugs to one or another of the galleys, the said means being controlled by the movement of the transporter.

54. In a slug casting machine, the combination of a plurality of galleys, a movable gate to control the delivery of the slugs to one or another of the galleys, and means for effecting the movement of the gate.

55. In a slug casting machine, the combination of a movable line transporter, a plurality of galleys, a movable gate to control the delivery of the slugs to one or another of the galleys, and connections whereby the movement of the transporter effects the movement of the gate.

56. In a slug casting machine, the combination of a movable line transporter, a plurality of galleys, a device to advance the slugs in the galleys, and a movable gate to control the delivery of the slugs to one or another of the galleys, said gate being moved in one direction by the transporter and in the opposite direction by the advancing device.

57. In a slug casting machine, the combination of a vertically movable line transporter, a plurality of galleys, a movable gate to control the delivery of the slugs to one or another of the galleys, and means for effecting the movement of the gate at the alternate ascents of the transporter.

58. In a slug casting machine, the combination of a plurality of galleys, and mechanism for delivering the slugs to one or another of the galleys, together with means for rendering said mechanism inactive at will.

59. In a typographical machine, the combination of a vertically movable line transporter, a plurality of galleys, a movable gate to control the delivery of the slugs to one or another of the galleys, connections whereby the upward movement of the transporter effects the movement of the gate, and mechanism for arresting the upward movement of the transporter at predetermined intervals to present the movement of the gate at such times.

60. In a typographical machine, the combination of a vertically movable line transporter, a plurality of galleys, a movable gate to control the delivery of the slugs to one or another of the galleys, connections whereby the upward movement of the transporter effects the movement of the gate, and mechanism for arresting the upward movement of the transporter at predetermined intervals to prevent the movements of the gate at such times, together with means for rendering said mechanism inactive at will.

61. In a typographical machine adapted to produce at will either a single slug or duplicate slugs from a given matrix line, the combination of a plurality of galleys, and means whereby the single slugs are all delivered to one galley and the duplicate slugs are delivered successively to different galleys.

62. In a slug casting machine, the combination of a galley mechanism, means for assembling the slugs in different columns therein, and automatic means for controlling the delivery of the slugs to one or another of the columns as required.

In testimony whereof I have affixed my signature in presence of two witnesses.

FRANCIS B. CONVERSE.

Witnesses:
H. E. HOERTZ,
V. I. MONTENYOHE.